Patented Aug. 14, 1928.

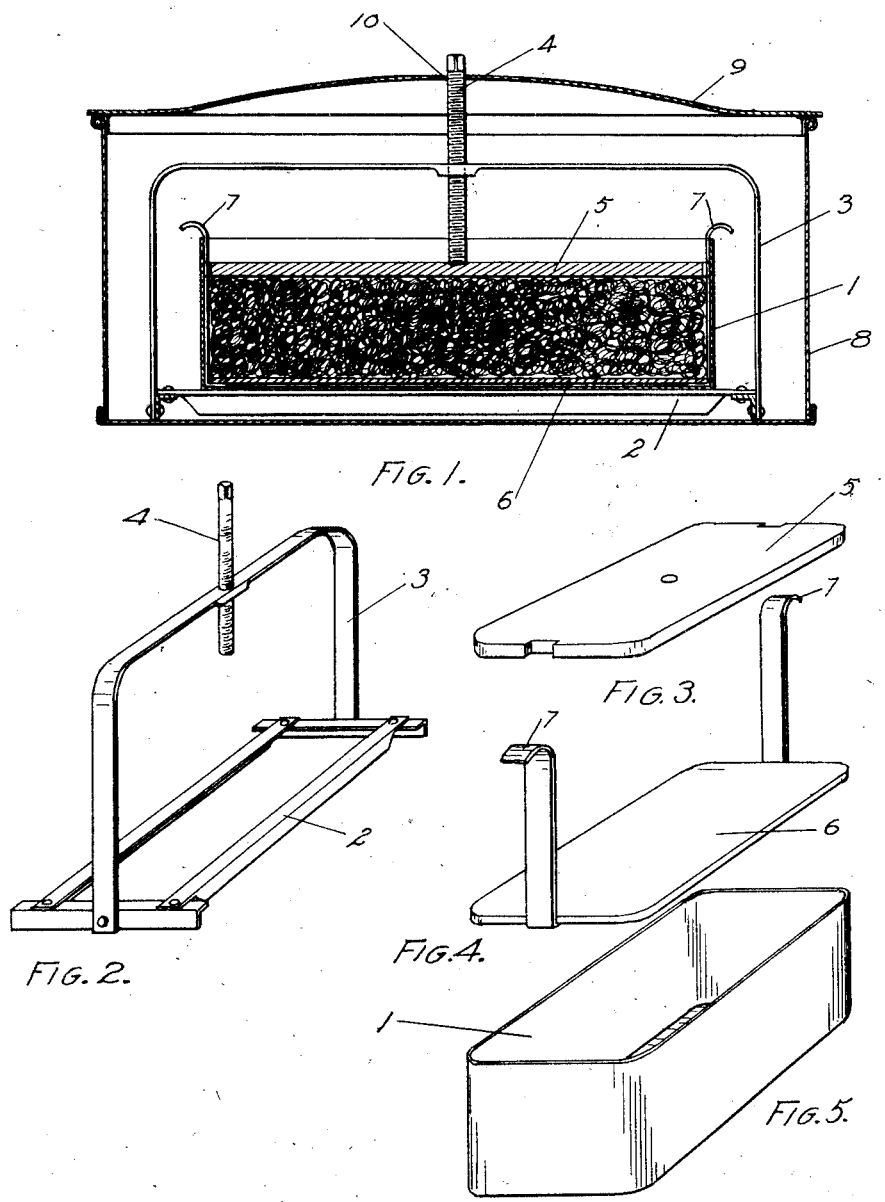

1,680,816

UNITED STATES PATENT OFFICE.

RALPH D. SPAULDING, OF LINESVILLE, PENNSYLVANIA.

UTENSIL FOR FORMING MEAT LOAVES.

Application filed July 6, 1926. Serial No. 120,614.

The present invention is designed to form meat loaves. Meats, if put under pressure while cooking and subjected only to their own juices, will form a loaf which may be readily sliced even though the meat, which forms the loaf, is made up of comparatively small pieces. In the present invention this is accomplished by putting the meat in a receptacle arranged in a double boiler keeping the water from the direct action on the meat and subjecting the meat as it softens under cooking to a following pressure. Features and details will appear from the specification and claims.

The apparatus of the invention is illustrated in the accompanying drawings as follows:—

Fig. 1 shows a central sectional view of the apparatus.

Fig. 2 a perspective view of the pressure frame.

Fig. 3 a perspective view of the pressure plate.

Fig. 4 a perspective view of the stripping plate.

Fig. 5 a perspective view of the meat loaf forming receptacle.

1 marks the receptacle which has the shape which it is desired to give the loaf. This receptacle is carried by a frame 2 having a pressure bridge 3. A screw 4 extends through the bridge against a pressure plate 5 which conforms in shape to that of the receptacle and under the influence of the screw exerts a following pressure on the inserted meat.

A stripping plate, or false bottom 6 is arranged on the bottom of the receptacle and has handles 7 extending upwardly therefrom so that the meat loaf may be stripped from the receptacle.

The receptacle is placed in a boiler 8 having a cover 9, the opening 10 providing means of operating the screw.

In operation water is placed in the boiler, below the top of the receptacle and the meat is cooked through the temperature communicated through the water.

What I claim as new is:—

1. In a meat loaf cooking utensil, the combination of a loaf-receiving receptacle; a frame in which the receptacle is placed; a pressure plate in the receptacle; a screw in the frame operating on the plate; and an outer boiler in which the receptacle is placed comprising a cover through which the screw is operated.

2. In a meat loaf cooking utensil, the combination of a loaf-receiving receptacle; an outer boiler in which the receptacle is placed; means exerting pressure on the loaf in the receptacle in place in the boiler; a false bottom in the receptacle; and a handle extending upwardly from the false bottom to the top of the receptacle.

In testimony whereof I have hereunto set my hand.

RALPH D. SPAULDING.